United States Patent [19]

Kranenberg

[11] E Re. 29,240

[45] Reissued May 31, 1977

[54] AS-WORKED, HEAT TREATED COLD-WORKABLE HYPOEUTECTOID STEEL

[75] Inventor: Helmut Kranenberg, Orchard Park, N.Y.

[73] Assignee: Bethlehem Steel Corporation, Bethlehem, Pa.

[22] Filed: Nov. 28, 1975

[21] Appl. No.: 636,253

Related U.S. Patent Documents

Reissue of:

[64] Patent No.: 3,892,602
Issued: July 1, 1975
Appl. No.: 358,751
Filed: May 9, 1973

U.S. Applications:

[62] Division of Ser. No. 242,473, April 10, 1972, Pat. No. 3,762,964.

[52] U.S. Cl. ..... 148/36
[51] Int. Cl.[2] ..... C22C 39/00; C21D 7/14
[58] Field of Search ..... 148/2, 12, 12.3, 36, 148/134, 143, 144

[56] References Cited

UNITED STATES PATENTS

| | | | |
|---|---|---|---|
| 1,295,568 | 2/1919 | Murray | 148/12 |
| 2,025,016 | 12/1935 | Chancellor | 148/12 |
| 2,814,578 | 11/1957 | White | 148/12 |
| 3,076,361 | 2/1963 | Epstein et al. | 148/12 X |
| 3,285,789 | 11/1966 | Grange et al. | 148/12 |
| 3,459,599 | 8/1969 | Grange | 148/12 |

FOREIGN PATENTS OR APPLICATIONS

| | | | |
|---|---|---|---|
| 1,161,234 | 8/1969 | United Kingdom | 148/12 |

*Primary Examiner*—C. Lovell
*Attorney, Agent, or Firm*—Joseph J. O'Keefe; Charles A. Wilkinson; John S. Simitz

[57] ABSTRACT

Hypoeutectoid steels are worked within a temperature range of between the $A_1$ temperature to 150° F. below the $A_1$ temperature. The cross-sectional area of the steels is reduced by not less than 60% during working. After working, the steels can be heated to about the $A_1$ temperature to obtain the optimum hardness and ductility for cold-working.

The as-worked structure and the heat treated structure are also described.

2 Claims, 6 Drawing Figures

AS-WORKED, HEAT TREATED COLD-WORKABLE HYPOEUTECTOID STEEL

Matter enclosed in heavy brackets [ ] appears in the original patent but forms no part of this reissue specification; matter printed in italics indicates the additions made by reissue.

This is a division of application Ser. No. 242,473 filed Apr. 10, 1972, now U.S. Pat. No. 3,762,964.

BACKGROUND OF THE INVENTION

This invention is in general directed to a method for working hypoeutectoid steels within a temperature range to effect a desired reduction in cross-sectional area. The hypoeutectoid steels can be heated to a temperature for a time to obtain optimum hardness and ductility suitable for cold-working. More specifically, the invention is directed to a method for working and heat treating hypoeutectoid steels, for example, steels containing about 0.30 to about 0.80% carbon, wherein said steels are worked to reduce the cross-sectional area by not less than 60% within a temperature range of about the $A_1$ temperature to about 150° F. below the $A_1$ temperature. The steels are subsequently heated to about the $A_1$ temperature to obtain a hardness and ductility suitable for cold-working, such as cold-heading and the like.

Steels used for cold working into various products, such as bolts, screws and the like, generally are of the hypoeutectoid type containing up to about 0.80% carbon.

Prior art practice in manufacturing cold-workable hypoeutectoid steels is to refine the steel in a metallurgical furnace, such as an electric furnace and the like, tap and teem the steels into ingot molds to form ingots. The ingots are hot-worked at an austenitizing temperature into the end product, such as bars, billets, rods, wire and the like. The end product is slow cooled to ambient temperature. The steels are spheroidize annealed to obtain a uniform structure which is substantially completely spheroidized; is substantially completely free of a carbide network and pearlite; and is relatively soft and ductile. Because of the duplex structure and high hardness of the steels after slow-cooling from the hot-working temperatures, the spheroidize anneal cycles which are used are lengthy. The steels must be soaked at the proper temperature for from about 15 hours to days to completely and effectively produce the desired microstructure and hardness and ductility required for good cold formability. In order to decrease the time of annealing, the steels are alternately heated and cooled to a few degrees of temperature above and below the $A_1$ temperature several times. Although the microstructure and hardness produced by the practices are acceptable by present day standards, the cyclic heating and cooling practice does not effectively reduce the length of the annealing cycle. Then, too, the microstructure of hypoeutectoid steels treated by the cyclic heating and cooling method can contain evidence of lamellar carbides. The hardness of the steels is reduced to a hardness suitable for cold-working after lengthy time at the spheroidize annealing temperature but maximum reduction in hardness may not be achieved.

Recently several improvements in the manufacture of cold-workable steels have been suggested. One such improvement is U.S. Pat. No. 3,285,789 issued Nov. 15, 1966 to Raymond A. Grange et al. titled "Method of Softening Steel." The improvement is directed to heating hypoeutectoid steels to temperatures wherein the steels are completely austenitic, working the steels while at these temperatures, cooling the steels to ambient temperature and spheroidize annealing the worked steels within a temperature range between the $A_1$ temperature to 50° F. below the $A_1$ temperature. The structure obtained after spheroidize annealing is satisfactory by present standards. Complete spheroidization and the elimination of lamellar carbides is not achieved in the as-worked condition.

The as-worked steels contain ferrite and pearlite, therefore the steels must be spheroidize annealed to produce a spheroidized structure.

Another improved method is directed to hypereutectoid steels and highly alloyed steels as described in U.S. Pat. No. 3,459,599 issued Aug. 5, 1969 to Raymond E. Grange titled "Method of Thermomechanically Annealing Steel." Hypereutectoid steels are heated to and drastically worked at a temperature not more than 150° F. above the $A_1$ temperature and [ ore ] *are* finished below the $A_1$ temperature but not more than 50° F. below the $A_1$ temperature. The method, while applicable to hypereutectoid steels, is not applicable to hypoeutectoid steels. The problems of complete spheroidization with elimination of lamellar carbides connected with hypoeutectoid steels is not solved.

Although prior art practices have been developed to roll steels ferritically as disclosed in U.S. Pat. No. 3,076,361 issued Feb. 5, 1963 to S. Epstein et al. titled "Rolling Steel in Ferritic State," the high alloy and tool steels to which the process is directed, must be heat treated, for example, spheroidize annealed, prior to heating and working. The special heat treatment prior to heating for working and controlled heating for working increase the cost of the production of the steel.

SUMMARY OF THE INVENTION

It is an object of this invention to provide a method for producing hypoeutectoid steels having good formability wherein said steels are worked within a temperature range below the $A_1$ temperature and the worked steels are heat treated at about the $A_1$ temperature for a time to decrease the hardness and increase the ductility of the steels.

It is an object of this invention to provide a method for producing hypoeutectoid steels suitable for cold-working wherein said steels are worked within a temperature range between about the $A_1$ temperature to about 150° F. below the $A_1$ temperature and the worked steels are heat treated at about the $A_1$ temperature for a time to obtain a desired hardness and ductility.

It is an object of this invention to provide a method for producing as-worked hypoeutectoid steels wherein said steels are worked within a temperature range between about the $A_1$ temperature to about 150° F. below the $A_1$ temperature to obtain a microstructure of fine well-dispersed spheroidal carbides in a fine ferritic matrix substantially devoid of lamellar carbides.

It is an object of this invention to provide a method for producing hypoeutectoid steels suitable for cold-working, said steels containing about 0.30 to about 0.80% carbon, wherein said steels are worked within a temperature range between about the $A_1$ temperature to 150° F. below the $A_1$ temperature for a time to reduce the cross-sectional area thereof by not less than 60% and the worked steels are heat treated at about the $A_1$ temperature for up to about six hours to produce a microstructure consisting of well-dispersed spheroidal carbides in a ferritic matrix, said steels being characterized by low hardness and good ductility.

Broadly, the invention includes working hypoeutectoid steels within a temperature range of about the $A_1$ temperature to about 150° F. below the $A_1$ temperature to reduce the cross-sectional area by not less than 60% and to heat treat the steels at about the $A_1$ temperature for a time to obtain a low hardness and ductility.

PREFERRED EMBODIMENT OF THE INVENTION

Figure 1:
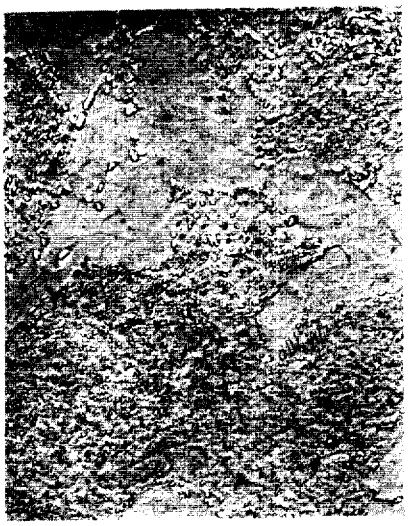
FIG. 1 is a reproduction of a photomicrograph taken at 2200 diameters of a hypoeutectoid steel as-worked by the method of the invention.

Hypoeutectoid steels suitable for cold-working, for example, cold-forming, cold-threading and the like, can be made by working the steels within a temperature range below about the $A_1$ temperature and heat treating the worked steels at about the $A_1$ temperature for a time to obtain optimum hardness and ductility. The as-worked hypoeutectoid steels have a microstructure of fine spheroidal carbides well-dispersed in a fine ferritic matrix substantially devoid of lamellar carbides. The heat treated steels have a microstructure of somewhat larger spheroidal carbides well dispersed in a ferritic matrix substantially devoid of lamellar carbides.

In the practice of the invention, hypoeutectoid steels are melted and refined in any type of metallurgical furnace, such as basic oxygen furnace, electric furnace, open-hearth and the like. The refined steels are tapped into a ladle and teemed into ingot molds in the conventional manner. The ingots thus formed are heated to an austenitizing temperature and are rolled into billets and cooled to black. At this stage of processing the steels, it is possible to pursue either one of two steps: (1) the billets can be heated to an austenitizing temperature and worked at the austenitizing temperature to effect a reduction in the cross-sectional area, said reduction is of such a nature that the steels will require additional working at a temperature to effect at least another 60% reduction in cross-sectional area to obtain the final size desired, after which the billets are cooled rapidly, for example, in air through the $A_3$–$A_1$ temperature range to a temperature range between the $A_1$ temperature and 150° F. below the $A_1$ temperature, in which temperature range the additional reduction in cross-sectional area is achieved, or (2) the billets can be reheated to a temperature range between about the $A_1$ temperature and 150° F. below the $A_1$ temperature and the steels worked within this temperature range to the desired final size. Whichever of the two above steps is taken, the hypoeutectoid steels are worked within a temperature range of between about the $A_1$ temperature to 150° F. below the $A_1$ temperature to obtain not less than 60% reduction in cross-sectional area to achieve the results of the invention. After working, the hypoeutectoid steels can be heat treated for a time at about the $A_1$ temperature. It will be understood that wherever heat treatment is used in the specifications and claims in regards to the steels processed by the method of the invention such heat treatment includes heating the steels to about the $A_1$ temperature for a time to reduce the hardness of the steels and to increase the ductility of the steels with little or no effect on the spheroidization microstructure of the steels other than a slight increase in the size of the carbides and ferritic matrix. It will also be understood that to raise the temperature of the steels to the working temperature range between about the $A_1$ temperature and 150° F. below the $A_1$ temperature it is possible to heat the steels above the $A_1$ temperature or even above the $A_3$ temperature so long as the steels are cooled to within the working temperature range described above before any reduction in cross-sectional area is started. Although working the steels within the temperature range of about $A_1$ temperature to about 150° F. below the $A_1$ temperature will achieve the results of the invention, good results can be achieved by working the steels within a temperature range of about 5° F. to about 75° F. below the $A_1$ temperature and better results can be achieved by working the steels within a temperature range of about 75° F. to about 150° F. below the $A_1$ temperature. It is, therefore, preferred to work the steels within a temperature range of about 75° F. to about 150° F. below the $A_1$ temperature.

The hypoeutectoid steels are worked within the temperature ranges mentioned above to obtain a reduction in the cross-sectional area of not less than 60%. Samples of the steels as-worked by the above described method were examined by electron microscopy at a magnification of 2200 diameters. The microstructure was found to consist of fine spheroidal carbides well-dispersed in a fine-grain ferritic matrix. A reproduction of an electron photomicrograph of the structure at the latter magnification is shown in FIG. 1. It can be seen that the carbides are well spheroidized and are less than 1 micron in size when compared with a line 5 microns long drawn on the lower right-hand corner of the electron photomicrograph for comparison purposes. The ferritic grains are also small, not more than 1.5 microns in size, although they appear to be very large when compared to the carbides. The microstructure is substantially free of lamellar carbides.

Figure 2:
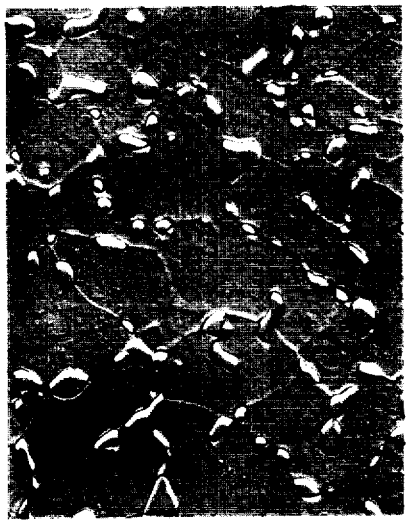
FIG. 2 is a reproduction of a photomicrograph taken at 2200 diameters of a hypoeutectoid steel as-worked and heat treated by the method of the invention.

The hypoeutectoid steels were heat treated at about the $A_1$ temperature for from about three hours to about six hours. A reproduction of an electron photomicrograph of a sample of the steels after heat treatment taken [ as ] *at* a magnification of 2200 diameters is shown in FIG. 2. The spheroidal carbides and ferrite grains have been coarsened by the heat treatment. The carbides are less than 5 microns in size when compared to a line 5 microns in length drawn in the lower right-hand corner of the photomicrograph for comparison purposes.

Figure 3:
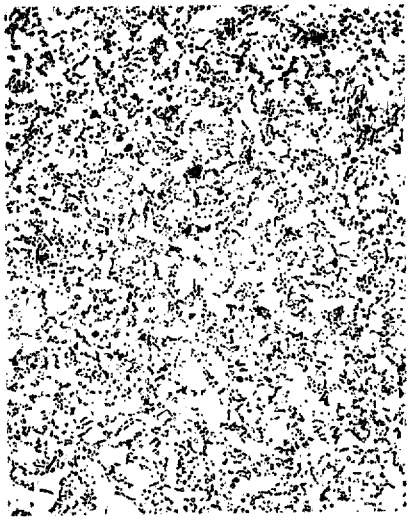
FIG. 3 is a reproduction of a photomicrograph taken at 500 diameters of a hypoeutectoid steel as-worked and heat treated by the method of the invention.

A microscopic examination at a magnification of 500 diameters of the steels after heat treatment is shown in FIG. 3. The microstructure can be seen to consist of finely divided spheroidal carbides well dispersed in a ferritic matrix. The microstructure is substantially free of carbide network, and lamellar carbides.

Figure 4:
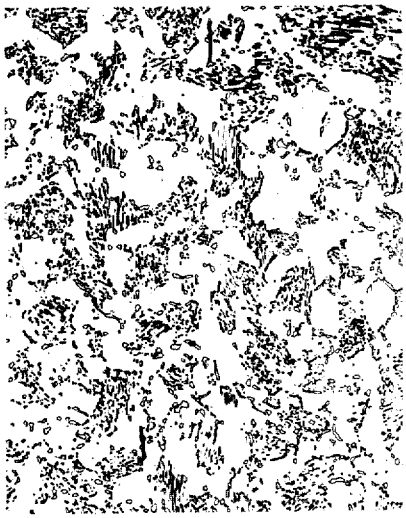
FIG. 4 is a reproduction of a photomicrograph taken at 500 diameters of a hypoeutectoid steel as-worked and spheroidize annealed by a conventional method.

A microstructure at a magnification of 500 diameters typical of hypoeutectoid steels processed by a conventional method of producing hypoeutectoid steels, that is, hot rolling at austenitizing temperatures, for example, 1550° F., and spheroidize annealing by a conventional annealing cycle wherein the steels are cyclically heated and cooled a few degrees in temperature above and below the $A_1$ temperature for about 17 hours, is shown for comparison purposes in FIG. 4. The carbides are tending to spheroidize but a large portion thereof retain lamellar-like formations and are not well-dispersed. Ferrite grains are outlined by the carbides. The ferrite grains appear to be larger in the conventionally worked and spheroidize annealed steels than the ferrite grains of the steels worked and heat treated by the method of the invention shown in FIG. 3.

The steels of the invention were tested for hardness both in the as-rolled and heat treated [ condition ] *conditions*. The as-rolled steels with a microstructure shown previously in FIG. 1 were found to have a hardness of 200 DPH (Vickers) to about 230 DPH (Vickers) which is equivalent to a hardness within a range of about 190 BHN to about 220 BHN. The hardness range is above the hardness desired in steels which are to be cold-worked. After heat treating for a time, about three hours to about six hours, by the method of the invention, the steels had been lowered in hardness by about 80 points in both DPH (Vickers) and BHN, which is well within the hardness range for cold-working the steels, for example, cold-heading.

Figure 5:
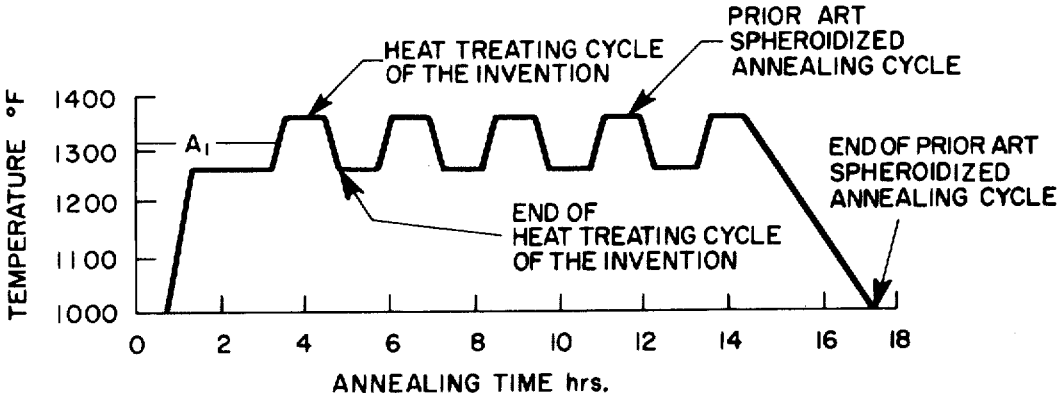
FIG. 5 is a graph comparing a conventional method of spheroidize annealing and the method of heat treating of the invention.

A comparison of the short heat treating cycle of the invention and a typical conventional spheroidize annealing cycle is shown in FIG. 5. Note that the heat treating cycle of the invention is considerably shorter than the typical conventional spheroidize annealing cycle.

Figure 6:
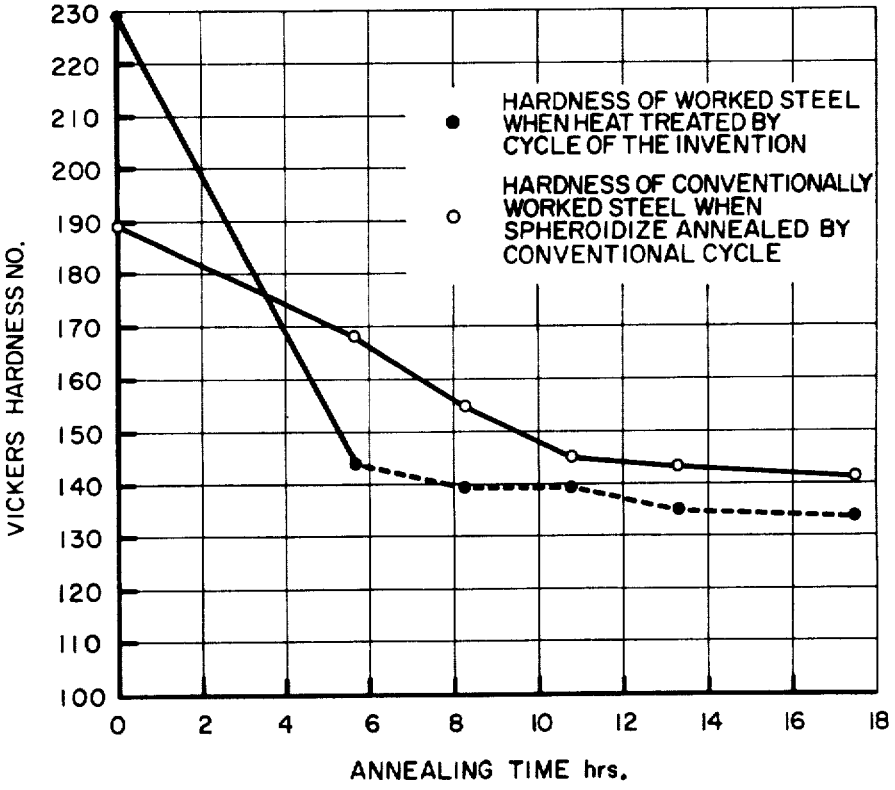
FIG. 6 is a graph showing a comparison of the decrease in hardness of steels worked and spheroidize annealed by a conventional method and by the method of the invention.

FIG. 6 is a comparison of the effect of the heat treating cycle of the invention on the as-worked hardness of hypoeutectoid steels and a typical conventional spheroidize annealing cycle in the as-worked hardness of the hypereutectoid steels. It will be noted that the as-worked hardness of the hypoeutectoid steels of the invention was higher than the as-worked hardness of hypoeutectoid steels prepared by a conventional hot working process. However, the hardness of the hypoeutectoid steels worked by the method of the invention decreased much more rapidly when heat treated than the hardness of the hypoeutectoid steels worked by conventional hot working process. In fact, the hardness of the hypoeutectoid steels of the invention after heat treating at about the $A_1$ temperature for about six hours is comparable to the hardness of hypoeutectoid steels hot rolled by conventional hot rolling and spheroidize annealed by conventional annealing cycle for about 17 hours. As seen in the dotted line, the hardness of the hypoeutectoid steels of the invention is lowered slightly when heat treated for longer periods of time. At each interval of time the hardness of the hypoeutectoid steels of the invention is lower than the hypoeutectoid steels prepared by a conventional hot rolling and spheroidize annealing cycle.

The as-worked hardness of the hypoeutectoid steels of the invention may be sufficiently high to preclude cold forming, however the tensile strength and reduction in area of these steels are better than conventionally processed steels of the same grade. Therefore, in some application, the hypoeutectoid steels of the invention can be used in the as-worked condition.

It will be understood that wherever percentages are mentioned in these specifications and claims, such percentages are on a weight basis unless otherwise noted.

In a specific example of the invention, a hypoeutectoid steel having a chemical analysis of: carbon 0.39%, manganese 0.75%, phosphorus 0.017%, sulfur 0.022%, silicon 0.18% was prepared in a basic oxygen furnace. The steel was melted, poured and teemed into 34 inches $\phi$ ingot molds. The ingots were bloomed to 4 inches by 4 inches square billets and cooled to ambient temperature. The billets were reheated to austenitizing temperature and reduced in size to 2-⅛ inches × 1-½ inches billets, finished at 1900° F. and allowed to drop in temperature to about 1200° F. in air. The billets were reduced in cross-sectional area by 60.4% to 1-¼ inches in diameter. The rounds were air cooled to ambient temperature. Microscopic examination at a magnification of 22,000 diameters of samples cut from the bars showed a microstructure of fine, well-dispersed spheroidal carbides of about 0.1 to 0.3 microns in size in a fine-grained ferritic matrix of about 0.5 to 1.5 microns in size, devoid of lamellar carbides. The bars were heated in a furnace at a temperature of about 1300° F. for five hours. The bars were slow cooled to room temperature.

Microscopic examination at a magnification of 8200 diameters of the steel after heat treatment disclosed a microstructure of well-dispersed spheroids of carbides of about .5 to 2.5 microns in size in a ferritic matrix of about 3 to 10 microns in size. The hardness of the as-rolled bars was 229 DPH (Vickers). After heat treating, the hardness was 144 DPH (Vickers). Tensile tests of as-rolled bars showed the steels to have a tensile strength of 101,000 pounds per square inch and a reduction-in-area of 68%. The reduction-in-area compares favorably to steels processed by prior art methods which had a tensile strength of 89,000 pounds per square inch and a reduction-in-area of 63%.

The bars were heat treated at 1300° F. for five hours. Tensile tests showed the steels to have a tensile strength of 73,000 pounds per square inch and a reduction-in-area of 79%. The ductility of the bars prepared by the method of the invention had improved ductility as compared to the conventionally treated bars.

I claim:

1. A heat treated hypoeutectoid steel consisting essentially of about 0.30 to about 0.80% carbon and the remainder iron and incidental impurities characterized by having good formability and a microstructure comprising fine well-dispersed spheroidal carbides having a size of [ not more than 0.3 ] *about 0.5 to 2.5* microns in a ferritic matrix, said ferritic matrix being free of lamellar carbides and having a grain size of about three microns to about ten microns.

2. An as-worked hypoeutectoid steel characterized by having high strength and good ductility, said steel consisting essentially of about 0.30 to about 0.80% carbon and the remainder iron and incidental impurities having a microstructure comprising finely-divided well-dispersed spheroidal carbides in a fine-grain ferritic matrix, said carbides being not more than 1 micron in size and said ferritic matrix having a grain size of not more than 1.5 microns.

* * * * *